April 5, 1927.
H. T. LANG
DYNAMO ELECTRIC MACHINE
Filed July 23, 1926
1,623,846
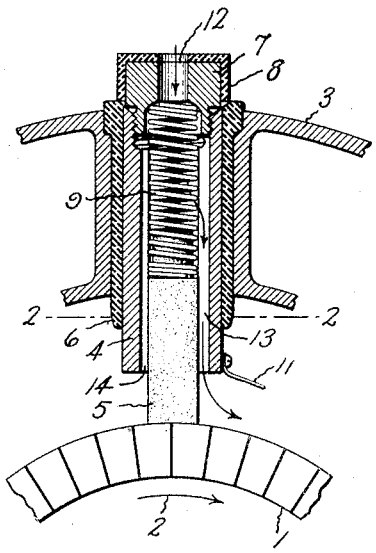
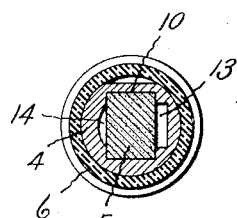
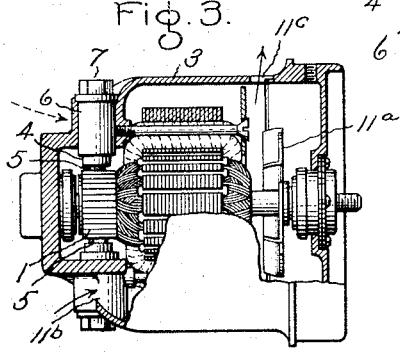
Inventor:
Henry T. Lang,
by *Alexander S. Lang*
His Attorney.

Patented Apr. 5, 1927.

1,623,846

UNITED STATES PATENT OFFICE.

HENRY T. LANG, OF CLEVELAND, OHIO, ASSIGNOR TO ELECTRIC VACUUM CLEANER COMPANY, INC., OF CLEVELAND, OHIO, A CORPORATION OF NEW YORK.

DYNAMO-ELECTRIC MACHINE.

Application filed July 23, 1926. Serial No. 124,509.

The present invention relates to dynamo-machines and especially to such machines which embody as a part of their structure a current-carrying brush which engages a rotating part of the machine.

In certain machines of this type, for example, small motors, there is provided a brush holder in the form of a tube in which the brush is located, the brush being held in engagement with the rotating part of the machine by a coiled spring located in the tube, the spring being used also to convey the current which flows through the brush. In such constructions, if the current flowing through the spring becomes too great, it will heat the spring to such an extent as to take the temper out of it thus destroying its usefulness for performing the mechanical function of holding the brush in contact with the rotating part of the machine.

The object of the present invention is to provide an improved construction and arrangement for cooling the brush holding spring in a construction of the type referred to, and for a consideration of what I believe to be novel and my invention, attention is directed to the accompanying description and the claims appended hereto.

In the drawing, Fig. 1 is a vertical, sectional view of a structure embodying the invention, the rotating part of the machine being indicated diagrammatically; Fig. 2 is a sectional view taken on line 2—2, Fig. 1; and Fig. 3 is a detail view, partly in section, of a complete motor.

Referring to the drawing, 1 indicates a rotating part of a dynamo-electric machine, in the present instance, the commutator of a motor. The direction of rotation is indicated by the arrow 2. 3 indicates the frame of the machine in which is mounted a tube 4 in which a carbon brush 5 is located. Surrounding tube 4 is a shell 6 of insulating material which serves to insulate the tube from the casing 3. The upper end of tube 4 is threaded and receives a cap 7 covered with insulating material 8. Connected to brush 5 is a spring 9 the upper end of which is located in a socket in cap 7. When the cap is screwed in position, the spring is held under compression to force the brush against the rotating part 1, as is well understood. Tube 4 is round and is provided on its inside with slots 10 in which the sides of the brush 5 slide, the brush being rectangular in cross section. Connected to tube 4 is a conductor 11 which is one of the terminals of a winding of the dynamo-electric machine. $11^a$ indicates a ventilating fan for the motor and $11^b$ and $11^c$ the frame openings through which the air flows as is indicated by the arrows. In this connection, it will be understood that there are several openings $11^b$ arranged in the end of the motor casing in proximity to the brush holders and that air is drawn in through these openings over the windings of the machine and is discharged through the openings $11^c$ in the side wall of the frame adjacent its forward end.

The construction so far described is a known one, and is to be taken as typical of any suitable construction of this type. In use, the current flows through brush 5, spring 9, cap 7, tube 4 and conductor 11 in series, as is well understood.

According to my invention, I provide an opening 12 in cap 7 through which air may flow, and on what may be termed the back side of tube 4, that is, the side of the tube beyond the brush as regards the direction of rotation of the rotating part, I provide a continuous, enlarged slot 13 through which air may flow toward the rotating part, as is indicated by the arrows. With this arrangement, I have found that the rotating part acts as a sort of pump to draw air down through opening 12 and slot 13, the circulation being assisted by ventilating fan $11^a$ which tends at the same time to suck air down through opening 12 and slot 13. This flow of air passes over the spring 9 and serves to carry heat away from it, thereby keeping it cool. By this means, therefore, a spring of a certain size is rendered capable of carrying a larger current than heretofore, without becoming overheated. In other words, the current carrying capacity of the spring is increased materially.

In the brush construction shown, there is a longitudinal slot 14 on the side of the brush opposite to slot 13. The slot 14, however, is merely incidental to the construction, being present because of the fact that tube 4 is round. It performs no function as far as cooling action is concerned and at the same time is so small that it does not in any way interfere with the action just described.

With the above-described arrangement, I have found in actual practice, that I am enabled in the same construction to use, without overheating, a spring construction which otherwise would quickly overheat, whereby the spring would be rendered useless in performing its function of maintaining the brush in engagement with the rotating part.

What I claim as new and desire to secure by Letters Patent of the United States, is:

1. In a dynamo-electric machine, the combination of a rotating part, a brush, a spring which biases the brush toward the rotating part, and means providing a conduit which extends down over the spring and terminates adjacent to the rotating part beyond the brush as regards the direction of rotation of the rotating part.

2. In a dynamo-electric machine, the combination of a rotating part, a casing, a tube in the casing, a brush in the tube, a spring in the tube which biases the brush toward the rotating part, and means providing a ventilating conduit in the tube which conduit terminates adjacent to the rotating part beyond the brush as regards the direction of rotation of the rotating part.

3. In a dynamo-electric machine, the combination of a casing, a rotating part, a tube in the casing, a cap which closes the outer end of said tube, a brush in the tube, and a spring in the tube which biases the brush toward the rotating part, said cap being provided with an opening and said tube being provided with a longitudinally extending slot in its inner surface on the side of the tube beyond the brush as regards the direction of rotation of the rotating part.

4. In a dynamo-electric machine, the combination of a rotating part, a brush, a spring which biases the brush toward the rotating part, means providing a conduit which extends down over the spring, and means for effecting circulation of air through said conduit to cool the spring.

5. In a dynamo-electric machine, the combination of a rotating part, a casing, a tube in the casing, a brush in the tube, a spring in the tube which biases the brush toward the rotating part, means providing a ventilating conduit for the tube, and means for effecting a circulation of air through said conduit.

6. In a dynamo-electric machine, the combination of a casing, a rotating part, a tube in the casing, a cap which closes the outer end of said tube, a brush in the tube, and a spring in the tube which biases the brush toward the rotating part, said cap being provided with an opening and said tube being provided with a longitudinally extending slot in its inner surface, and means for effecting circulation of air through said opening and slot.

In witness whereof, I have hereunto set my hand this 20th day of July, 1926.

HENRY T. LANG